US009863030B2

(12) United States Patent
Wang et al.

(10) Patent No.: US 9,863,030 B2
(45) Date of Patent: Jan. 9, 2018

(54) STRESS RELIEF OF MECHANICALLY ROUGHENED CYLINDER BORES FOR REDUCED CRACKING TENDENCY

(71) Applicant: GM Global Technology Operations LLC, Detroit, MI (US)

(72) Inventors: Yucong Wang, West Bloomfield, MI (US); Martin S. Kramer, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 80 days.

(21) Appl. No.: 15/042,208

(22) Filed: Feb. 12, 2016

(65) Prior Publication Data

US 2016/0258047 A1 Sep. 8, 2016

Related U.S. Application Data

(60) Provisional application No. 62/126,807, filed on Mar. 2, 2015.

(51) Int. Cl.

| | |
|---|---|
| ***B23B 9/00*** | (2006.01) |
| ***C23C 4/02*** | (2006.01) |
| ***F02F 1/00*** | (2006.01) |
| ***C22F 1/04*** | (2006.01) |
| ***C22F 1/00*** | (2006.01) |
| ***C22F 3/00*** | (2006.01) |

(52) U.S. Cl.

CPC ................ *C23C 4/02* (2013.01); *C22F 1/002* (2013.01); *C22F 1/04* (2013.01); *C22F 3/00* (2013.01); *F02F 1/00* (2013.01); *F02F 2001/008* (2013.01); *F02F 2200/06* (2013.01)

(58) Field of Classification Search

CPC .... C23C 4/02; C23F 1/002; C22F 1/04; C22F 3/00; F02F 1/00; F02F 3001/008; F02F 200/06

USPC .................................. 123/193.2; 29/888.061

See application file for complete search history.

(56) References Cited

U.S. PATENT DOCUMENTS

| | | | | |
|---|---|---|---|---|
| 4,900,639 A * | 2/1990 | Hodes | C23C 4/06 | 384/912 |
| 5,496,651 A * | 3/1996 | Nishimoto | C25D 3/562 | 205/172 |
| 5,866,271 A * | 2/1999 | Stueber | C23C 28/00 | 148/240 |
| 5,958,521 A * | 9/1999 | Zaluzec | C23C 4/02 | 219/76.12 |
| 2006/0048386 A1* | 3/2006 | Boehm | C23C 4/02 | 29/888.06 |
| 2007/0190272 A1 | 8/2007 | Kanai et al. | | |
| 2012/0317790 A1 | 12/2012 | Flores et al. | | |

(Continued)

FOREIGN PATENT DOCUMENTS

| | | |
|---|---|---|
| CN | 101225466 A | 7/2008 |
| EP | 1225324 B1 | 10/2009 |

*Primary Examiner* — Marguerite McMahon

(57) ABSTRACT

A method of treating the surface of an aluminum-based engine block cylinder bore that has been mechanically roughened. In one form, this method includes using vibratory stress relief, elevated temperature stress relief or cryogenic stress relief so that residual stresses imparted to the surface by the roughening process are reduced. In this way, a protective coating that is also applied to the bore surface will exhibit better adhesion and lower incidence of stress-induced or fatigue-induced cracking.

15 Claims, 5 Drawing Sheets

(56) References Cited

U.S. PATENT DOCUMENTS

| | | | | |
|---|---|---|---|---|
| 2014/0335282 A1* | 11/2014 | Ernst | C23C 4/02 | 427/455 |
| 2014/0364042 A1* | 12/2014 | Whitbeck | B24B 5/08 | 451/51 |
| 2015/0118516 A1* | 4/2015 | Boileau | C23C 4/08 | 428/653 |

* cited by examiner

STRESS RELIEF OF MECHANICALLY ROUGHENED CYLINDER BORES FOR REDUCED CRACKING TENDENCY

This application claims priority to U.S. Provisional Application 62/126,807, filed Mar. 2, 2015.

BACKGROUND

This invention is related generally to achieving better adhesion between a protective coating and a target substrate, and in particular to creating a tribologically suitable surface in engine cylinder bores by mechanical roughening the bores in such a way that internal stresses in the bores and resultant cracking in a subsequently-applied thermal sprayed coating are reduced.

The cylinder walls and cylinder liners of an internal combustion engine (ICE) are manufactured to exacting standards with close tolerances as a way to promote efficient engine operation. While additional increases in efficiency may also be realized through hotter, more complete combustion processes, the increased thermal load imparted to the walls and liners (also referred to collectively or individually as bores) of the engine block provides additional structural and related durability challenges to lightweight, efficient engine designs.

Thermal spray techniques have been shown to be an effective way to deposit protective coatings—such as thermal barrier coatings (TBCs), wear resistant coatings, anti-corrosion coatings or the like—onto the bores. Adhesion of the protective coating to a substrate is a very important metric for determining the suitability of the coating for a particular application (such as for the harsh environments produced within the combustion chamber of an internal combustion engine cylinder bore). Traditional approaches for enhanced coating adhesion to the cylinder bore substrate involve various surface activation pretreatment steps, including approaches such as grit blasting with ceramic particles and high-pressure water jet blasting. Grit blasting, while effective, leaves behind particle residue that can contaminate subsequent coating application steps unless costly and time-consuming cleansing steps are also employed. Water jet blasting, while less likely to leave behind undesirable byproducts, uses large quantities of water, or requires a complex water treatment system for water recycling. Moreover, the presence of contaminants or byproducts within the water once the roughening operation is complete make it undesirable to dispose of the spent water back into a local aquatic environment. Furthermore, the high-pressure water jet blasting approach has high capital costs.

A more recent development promises to achieve protective coating adhesion results similar to grit blasting and water jet blasting, but without the drawbacks. Mechanical roughening/locking involves carving geometric shapes out the bore wall with cutting machinery through one or more of chipping, pressing, sliding, rolling and related steps. Such roughening changes the topography on the substrate surface to promote an interlocking fit between the coating and the substrate. In one such form, trapezoidal or dovetail-shaped undercuts are formed in the roughened bore surface to promote this interlocking fit. An example of such an approach may be found in U.S. Published Application 2012/0317790 (hereinafter the '790 Publication) filed by Flores, Baumgartner and Rach and entitled TOOL AND METHOD FOR MECHANICAL ROUGHENING the entirety of which is hereby incorporated by reference.

A significant problem with mechanical roughening is that large amounts of internal stresses are generated in the substrate, especially in the region nearest to the surface. This in turn may result in a high tensile stresses and concomitant shear loads between the substrate and the subsequently-applied coating in the bore's axial and tangential directions, where such stresses and related loads cause cracking that is especially detrimental to the performance and durability of thermal spray coatings. As such, the present inventors believe that there is a need for an approach to cylinder bore pretreatment to permit a higher integrity bond between the mechanically-roughened bore and a protective coating placed on the bore through the reduction of residual stresses in the roughened bore substrate.

SUMMARY

According to a first aspect, a method of treating a cylinder bore that is formed in an aluminum-based engine block includes activating an exposed surface of the bore with mechanical roughening, and reducing residual stress present in the activated surface. Such a stress-relieving mechanism helps reduce the cracking tendency of a protective coating that is applied to the activated bore surface. In one form, the stress-relieving may include reduced tensile stresses, while in another may include the introduction of compressive residual stresses to offset the tensile stresses. A variety of particular stress-relieving approaches may be used, including vibration-induced stress relief (also referred to herein as vibration stress relief or vibratory stress relief (in either case, VSR)), elevated temperature stress relief or reduced temperature stress relief in the form of cryogenic cooling.

According to another aspect, method of forming a cylinder bore in an aluminum-based engine block is disclosed. The method includes casting the block to define one or more cylinder bores therein, activating an exposed surface of the bore with mechanical roughening and reducing residual stress present in the activated surface. The stress reducing is achieved by one or more of VSR, the application of an elevated temperature or the application of a cryogenic temperature.

According to another aspect, an aluminum-based engine block is disclosed. The block includes one or more cylinder bores formed therein, where the bore or bores have an exposed surface (specifically, the surface that faces a piston that is configured to traverse the bore along its axial dimension) that is formed with mechanically-roughened features. Importantly, the exposed surface is subjected to a treatment to counteract the effects of any increased residual stress that is introduced by the mechanical roughening.

BRIEF DESCRIPTION OF THE DRAWINGS

The following detailed description of the preferred embodiments of the present invention can be best understood when read in conjunction with the following drawings, where like structure is indicated with like reference numerals and in which the various components of the drawings are not necessarily illustrated to scale.

DETAILED DESCRIPTION

Figure 1:
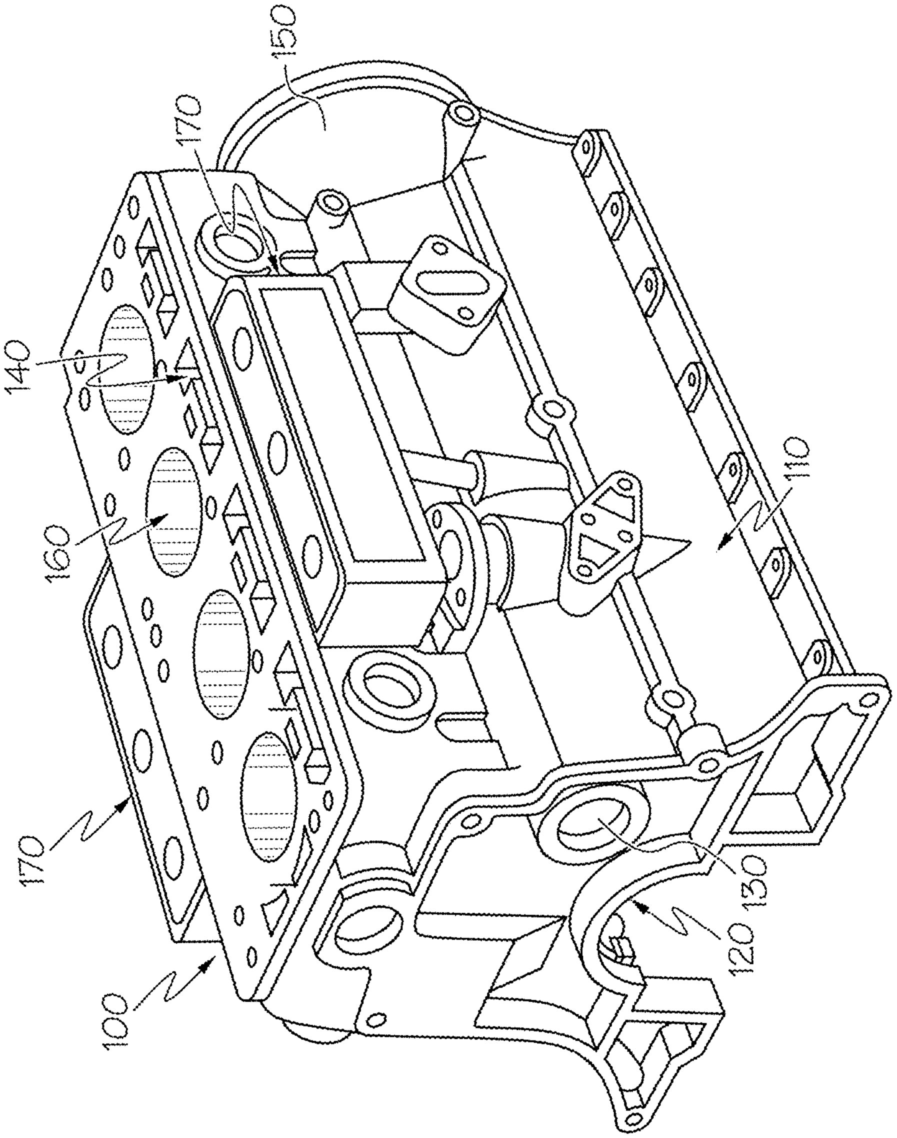
FIG. 1 depicts an isometric view of a notional engine block with four cylinder bores formed therein and a vibration-based device temporarily mounted thereto such that the cylinder bores could be subjected to VSR treatment according to an aspect of the present invention.

Referring first to FIG. 1, a simplified view of four-cylinder automotive internal combustion engine block 100 is shown. The block 100 includes portions for—among other things—the crankcase 110, the crankshaft bearing 120, the camshaft bearing 130 (in the case of engines with overhead valves and pushrods), water cooling jackets 140, flywheel housing 150 and cylinder bores 160. These bores 160 may include an alloyed surface layer (not shown) that is either integrally formed with the substrate of each bore 160, or as a separate insert or sleeve that is sized to fit securely within. In one form, such alloyed surface layer can be used to enhance the corrosion, wear or thermal resistance of the bore 160. In fact, in engine configurations where the block 100 is cast from a lightweight material, such as aluminum and its alloys (such as A380, A319 or A356), the addition of such surface layers was traditionally deemed to be necessary as a way to impart additional thermal and wear resistance. In one form, this alloyed surface layer is made from a heavy cast iron or related material. Cylinder bore 160 of engine block 100 is defines a circumferential inner wall 160A.

Figure 2:
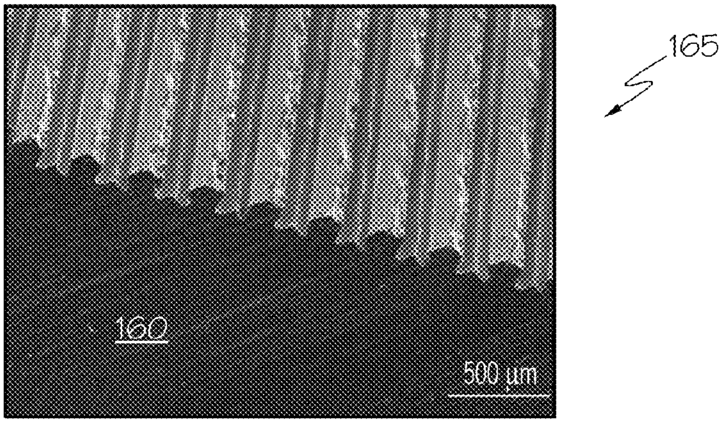
FIG. 2 depicts a high magnification of a cylinder bore of the engine of FIG. 1 that has been subjected to mechanical roughening to produce dovetail like undercut patterns.
Figure 3A:
FIG. 3A (PRIOR ART)
FIGS. 3A and 3B depict two different magnifications of cracking that has occurred in a thermal sprayed coating that has been applied to a mechanically-roughened cylinder bore surface according to the prior art.
Figure 3B:
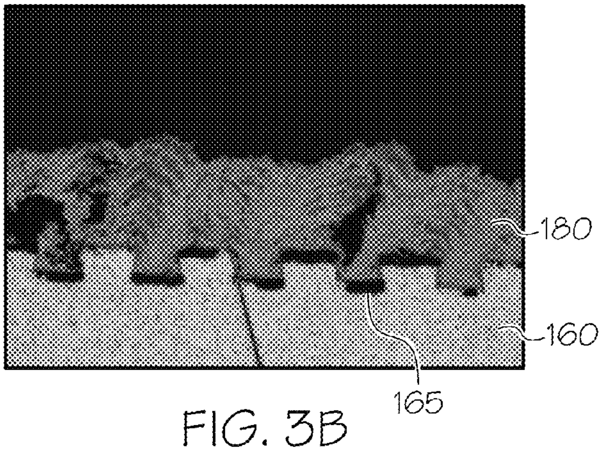
FIG. 3B (PRIOR ART)
Figure 4:
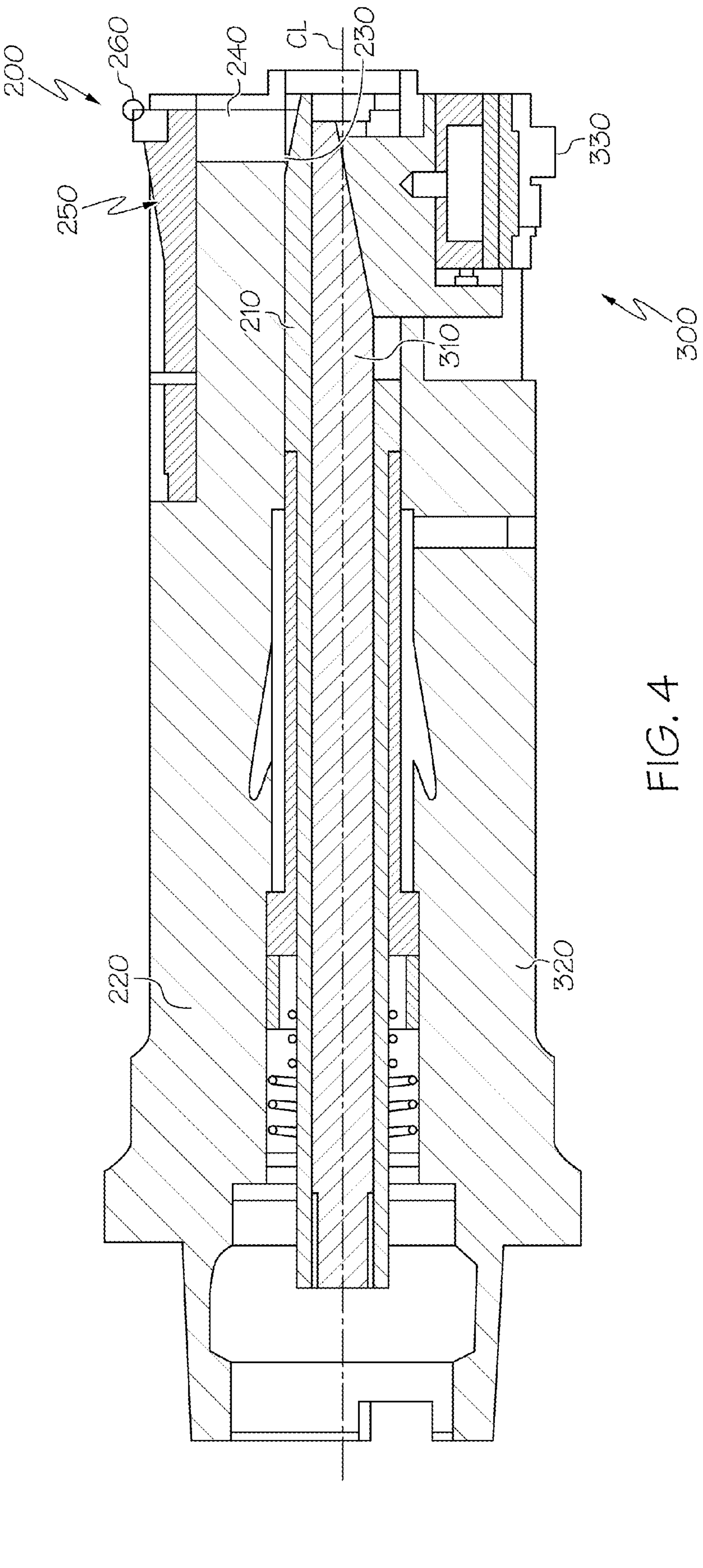
FIG. 4 depicts a mechanical roughening tool that can be used to form the patterns of FIG. 2.

Referring next to FIGS. 2 through 4, the use of a mechanical roughening tool to produce geometric shapes near the surface of the bore wall leads to undesirable tensile strengths in the bore surface, which in turn tends to produce cracking through and along the surface of the subsequently-applied protective TBC or related coating. As a general rule, it is desirable to keep the residual stresses that develop to be as close to zero as possible; to the extent that residual stresses do evolve which are positive (i.e., tensile in nature), it is preferable to keep them below about 200 MPa (i.e., roughly 30 ksi); the present invention, by reducing these tensile stresses in the bore surface to levels at or below such values, inhibits the tendency of the coating to crack.

Referring with particularity to FIG. 4, first and second components on a mechanical roughening tool 200 (shown above the axial centerline CL), 300 (shown below the axial centerline CL) for producing the mechanically roughened surface of FIG. 2 are shown. First and second feed rods 210, 310 are axially guided within their respective base bodies 220, 320. When the feed rod 210 is moved in the axial direction of the base body 220 in the direction of the second tool 200, a tubular cone 230 radially displaces a feed pin 240 which in turn presses a bending support 250 with the form blade plate 260 in a radially outward direction, thereby performing a feed motion of the tool 200. The position of the bending support 250 is movable through axial adjustment. Likewise, the feed rod 310 forms a desired dovetail pattern 165 in the bore 160 wall with a roller 330 from the cut-out previously formed by tool 200. It is particularly advantageous for the roller 330 to be radially fed in a positive fashion such that the feed force can be controlled irrespective of the centrifugal force that acts on the roller 330. The slant of the roller 330 is preferably adjusted to be orthogonal to the longitudinal direction of the pattern 165 formed within the bore 160. As such, the roller 330 rolls over the pattern 165 without sliding movement. Additional details associated with the operation of the mechanical roughening tool 200, 300 may be found in the '790 Publication.

Referring with particularity to FIGS. 3A and 3B in conjunction with FIG. 2, details associated with mechanically-roughened patterns formed in the surface of a cylinder bore 160, as well as scenarios where a subsequently-applied coating 180 (such as a TBC, wear resistant coating, anti-corrosion coating, bond-promotion coating or the like) are shown. Examples of this last coating type may be found in co-pending U.S. patent application Ser. No. 14/733,121 entitled $TIO_2$ APPLICATION AS BONDCOAT FOR CYLINDER BORE THERMAL SPRAY that is owned by the Assignee of the present invention and the disclosure of which is hereby incorporated by reference in its entirety. Importantly, the use of the mechanical roughening shown in FIG. 2 has a tendency to produce residual stresses (As well as concomitant cracking) in both the surface of a cylinder bore 160 and subsequently-applied coating 180.

Within the present context, residual stresses in a body are those which are not necessary to maintain equilibrium between the body and its environment. They may be categorized by cause (e.g. thermal or elastic mismatch), by the scale over which they self-equilibrate, or according to the method by which they are measured. From a length scale perspective, residual stresses originate from misfits between different regions. In many cases, these misfits span large distances, for example, those caused by the non-uniform plastic deformation of a bent bar. They can also arise from sharp thermal gradients, for example, those caused during casting, welding or heat treatment operations. Whether mechanically or thermally induced, so-called macrostresses are called type I because they vary continuously over large distances. This is in contrast to residual stresses which vary over the grain scale (type II or intergranular stresses) or the atomic scale (type III). In these cases, the misfitting regions span microscopic or submicroscopic dimensions. Low level type II stresses nearly always exist in polycrystalline materials (such as most metals) simply from the fact that the elastic and thermal properties of differently oriented neighboring grains are different. More significant grain scale stresses occur when the microstructure contains several phases, or when phase transformations take place. The type III category typically includes stresses due to coherency at interfaces and dislocation stress fields. Residual stresses arising from misfits either between different regions or between different phases within material determine different types of residual macro and micro residual stress. Overall, type II and type III stresses tend to be washed out by plasticity in the crack tip zone so that only type I stresses need be considered from a fatigue point of view. However, this is not true for short crack growth, which is microstructure and type II stress-dependent. As particularly regards cylinder bores in cast aluminum engine blocks, these surface stresses can—if left untreated—lead to crack formation in subsequently-applied coatings 180.

In particular, one way to reduce the cracking tendency in a thermal sprayed (or related) coating 180 for a cylinder bore 160 that has been pretreated with mechanical roughening includes using VSR to relieve the internal stresses in the bore 160 regions through ultrasonic vibration of the cylinder block 100 that contains the bores 160. In fact, the present inventors have determined that VSR reduces all three types of residual stresses discussed above. In general, VSR provides kinetic energy in both the macro-scale and the micro-scale. Thus, not only does it change macro-scale stress distribution in the workpiece, but also the microstructure and substructure by promoting the motion of sub-defects such as dislocations, twins and stacking faults. The result is lower density of dislocations, twins and stacking faults after VSR, and lower residual stresses from intergranular regions.

More particularly, VSR is a non-thermal stress relief method that uses the workpiece's own resonant frequency to boost the loading experienced by the induced vibration. Referring again to FIG. 1, one or more mechanical vibrating devices 170 are attached to block 100 and are configured to operate near (but not at) the resonant frequencies of block 100. A preferred setup for VSR treatment involves several steps, including first placing the block 100 upon load cushions (not shown). These cushions should be made of soft, yet resilient material, typically urethane or neoprene, and should be placed away from the corners of the block 100, so that workpiece damping is minimized; this in turn promotes increased resonant response to vibration. Second, the vibrating device 170 needs to be securely mounted on the block 100, yet placed away from block 100 corners and oriented so that its force-field output is perpendicular to its axis of rotation or nutation to maximize its chances of driving the block 100 into resonance; as shown with particularity in FIG. 1, two such vibrating devices 170 are used and situated on opposing sides of the block 100 from one another. In an alternative form (not shown), the block 100 can be securely clamped onto a vibrating table or related stand. Regardless of the configuration of the vibrating device 170, it is preferably secured with high-strength bolts or related connection means to promote a close-coupled response within the block 100. In addition, it is preferable to place a vibration measuring sensor (not shown) on one of the corners of the block 100, and in line with the force-plane (i.e., a plane perpendicular to the vibrating device 170 axis of rotation or nutation). The unbalance of the vibrating device 170 should be sufficient to drive the resonances of the block 100, minimally to a level of a few g's of acceleration. Third, the vibrating device 170 speed range must be capable of exceeding the highest expected resonance frequencies of the block 100. In one form, a maximum speed capability of at least 6000-8000-RPM is recommended. Tight motor speed regulation (±0.25%) of the vibrating device 170 is preferable as a way to improve the ability to detect and drive the suitable resonance conditions. Driving a resonance involves tuning the vibrating device 170 speed to the top of the resonance peak. This is increasingly challenging as block 100 rigidity increases, which causes resonances to become very narrow. To record such resonances, it is preferable to conduct a slow, automated scan through the speed range and plotting of the vibration response of the block 100. Once the resonance(s) recorded during the scan are acquired, the vibrating device 170 speed is then tuned so that the response of the block 100 to the imparted vibration is monitored. Fine tuning of the speed, plus tight speed regulation, enhances peak tuning and tracking capabilities. Moreover, quantifiable measures of the amount of residual stress reduction may be achieved by direct or indirect means. In one preferred former approach, direct measurement may be performed using X-ray diffraction.

Figure 5:
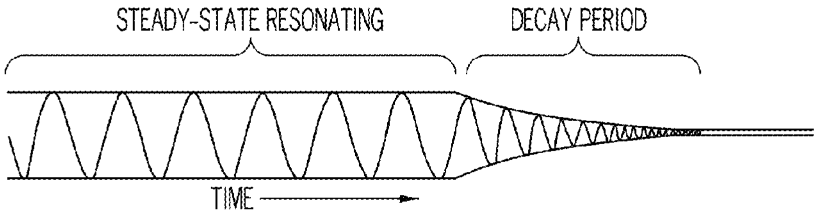
FIG. 5 depicts a waveform that demonstrates the time period that vibration continues in a sample after resonant excitation ceases.

Referring next to FIG. 5, the scan rate associated with VSR must be slow, not only because the resonance peaks are narrow, but also because the high inertia of the block 100; this is especially true in situations where the block 100 is contiguous with a massive object, such as the case of a bore that is part of a cylinder block 100. There is a significant time delay (called ring time) caused by this high block 100 inertia in the response to vibration. Ring time is defined as the time period a resonating body continues to vibrate (albeit in a decaying way) after resonant excitation is stopped. In one form, the value for scan rate used for engine block 100 is preferably between about 10 RPM/sec and 50 RPM/sec, while the vibrating device 170 speed is between 2500 RPM and 5000 RPM (which equates to roughly 40 to 80 Hz or cycles per second) to resonance; such vibrations may be oval shape, rotational or reciprocating.

Figure 6:
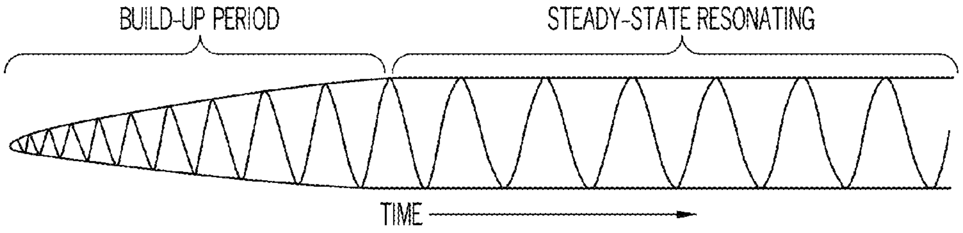
FIG. 6 depicts a reverse ring time that is the time period between the start of vibration excitation and full resonant amplitude.

Referring next to FIG. 6, when vibration is the excitation-causing resonance (rather than from a singular striking event, such as when a hammer is used to strike a bell), there is a time period between the beginning of vibration excitation, and the moment when full resonant amplitude is reached. During this time the amplitude is building-up or growing (the reverse of decaying), so this phenomenon is called reverse ring time (RRT). For large metal structures (such as engine block 100) that are stress relieved with vibration, ring or reverse ring times (the time periods are the same, whether the amplitude is growing or decaying), can be 20-40 seconds or longer. The ring time is important for achieving full resonant amplitude.

A method of finding the resonances of a block 100 during VSR is to scan through the vibrating device speed range, and record or plot the vibration amplitude versus the vibrating device speed. The effect of RRT, specifically the time delay between the beginning of resonant vibration and full resonant amplitude being achieved, dictates that the scan rate used to sweep through the vibrating device speed range (also referred to as the vibratory response range) be slow, in order to make an accurate record of the resonance pattern. Scanning too quickly will result in resonant peaks not being fully depicted or being missed entirely, since the block 100 will not have sufficient time to reach full amplitude resonance before the vibrating device speed increases (due to scanning) beyond the resonance frequency.

Figure 7:
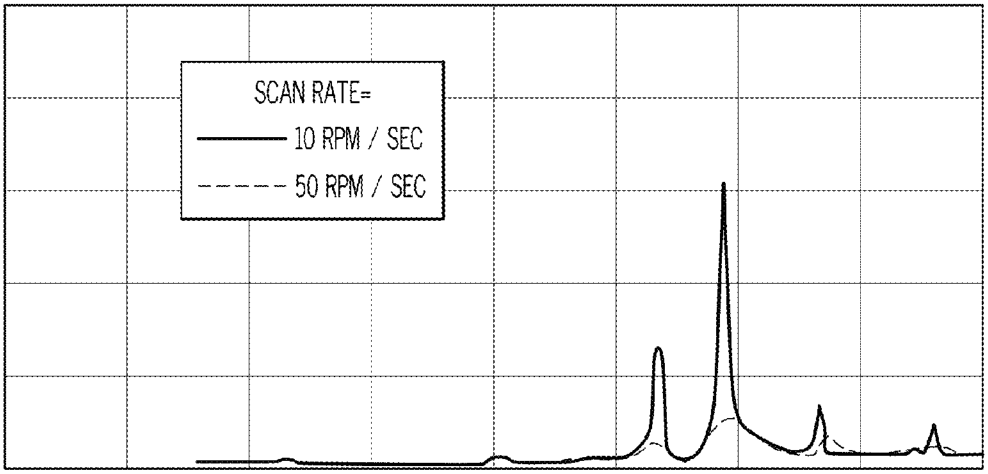
FIG. 7 depicts the effects of scanning at two different scan rates.

Referring next to FIG. 7, the results of two different scan rates (10 RPM/second and 50 RPM/second) are shown. Of the two, the lower scan rates of about 10 RPM/second has been found in practice to result in the accurate resonant peaks recording of a large number of blocks 100. The present inventors have determined that as block 100 size increases, it may be preferable to decrease the scan rate might in order to fully capture accurate resonance data. The most common responses to treatment include peak growth (which is typically the larger change) and peak shift in the direction of lower RPMs (which is typically the smaller change, at least percentage-wise). Typically, the resonance peaks are very narrow, causing any peak shifting to rapidly decrease the vibration amplitude, and hence, rapidly decrease of the rate of stress relief, since resonant amplitude is more effective in relieving stress. Thus, any peak shifting would benefit from a fine-tuning adjustment of the vibrating device 170 speed in order to track the peak to its final, stable position.

Figure 8:
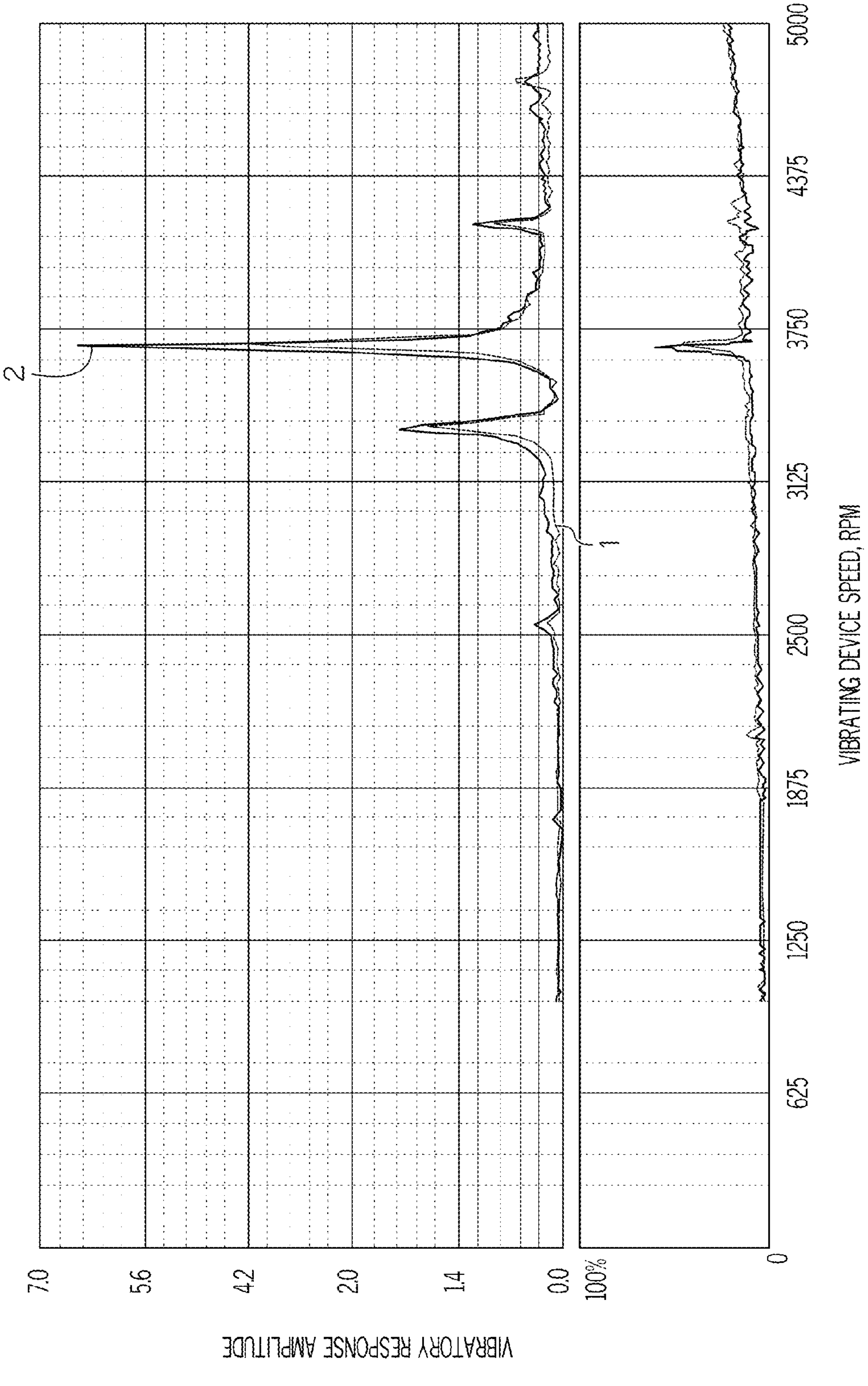
FIG. 8 depicts two plots showing workpiece acceleration and vibrating device input power, respectively for the VSR treatment of FIG. 1.

Referring next to FIG. 8, each of these responses (which often combine peak growth and peak shifting) is consistent with a lowering of the rigidity of the block 100, where such rigidity is associated with the presence of residual stress. By way of example, a common resonance pattern change that occurs during VSR is shown, where the large peak grew by 47%, while simultaneously shifting to the left by 28 RPM, which is less than a 0.75% change. In the present example, the equipment used to perform this stress relief had vibrating device 170 speed regulation of ±0.02%, and speed increment fine-tuning of 1 RPM, which allowed even subtle shifting of the peaks to be accurately tracked to their final, stable locale.

Another way to reduce the coating cracking tendency associated with post-roughening residual stresses is through elevated temperature means, such as induction heating, plasma guns, thermal spray guns and other means (collectively referred to herein as thermal stress relief). Significantly, it is important to avoid cylinder bore 160 surface oxidation during any such heating. In one form, the engine block 100 may be placed in a closable, controlled environment (not shown) to ensure that an inert gas may be used to protect the bore 160 surface from being oxidized before, during or after such heating. These heating processes are conducted in short time period. For example, with induction heating, the induction heaters are placed in each of the cylinder bores 160. The heat is turned on only for seconds or minutes to heat the bores and relieve the residual stresses. The aluminum bores may reach to a temperature between 300°-500° C. for a short time (seconds or minutes) and then slowly cool down. As mentioned above, the use of an inert gas may help guard against oxidation of the bore 160 surface. The treatment approaches with plasma guns and thermal spray guns were previously described in U.S. patent application Ser. No. 14/535,404 entitled SURFACE ACTIVATION BY PLASMA JETS FOR THERMAL SPRAY COATING ON CYLINDER BORES that is owned by the Assignee of the present invention and the disclosure of which is hereby incorporated by reference in its entirety. In particular, details pertaining to adjusting the thermal spray coating parameters associated with that application may help to relieve the internal stresses; examples include slowing the spray travel speed, as well as permitting more passes with thinner coating from each pass.

Yet another approach to stress relief that may arise from the mechanical roughening of the cylinder bores 160 involves using cryogenic stress relief. In this approach, cast aluminum alloy engine blocks (such as block 100 shown in FIG. 1) produced by suitable casting methods (such as sand casting, high pressure die casting or the like) may be subjected to extreme low temperatures (for example, in the range of between about −190° F. and −310° F.), such as through the use of a liquid nitrogen bath. In a short time (approximately 30 seconds or less), the block 100 will reach the desired cryogenic temperature, after which it is removed from the bath, and then allowed to warm back up to room temperature to effect a cryogenic temper. Normally, such a block 100 is allowed to heat up to room temperature in still air so as not to suffer thermal shock; however, if time is a constraint, an elevated heating protocol may be adopted that can be used in conjunction with experimental trials to determine that no harm is done to the component. During this temper process, many changes to the aluminum microstructure are occurring. One of the most important benefits is a reduction in the residual stresses that are inherent in the casting and or post-machining processes. Besides reducing the tendency of cracking, additional benefits may include increased fatigue life, improved thermal properties, lower creep and better dimensional control.

While cryogenic stress relief may have been used for iron-based engine block alloys, the present inventors are unaware of the use of for similar treatment on aluminum-based engine blocks such as block 100. Significantly, while iron-based blocks can be stress relieved at temperatures of near 800° F. with little damage to the structure, a similar block made from aluminum would experience significant distortion at these temperatures, as this is getting close to aluminum's roughly 1000° F. melting temperature. In fact, cryogenic stress relief is rare even in iron blocks, as the intricacies of cold tempering are not well understood. Further, to the extent that the process is understood, tempering by subjecting an aluminum engine block to such extreme low temperatures is often avoided for fears of damaging the cylinder bore surface or block. This is especially true in engine configurations where iron liners are formed as inserts into the bores for wear resistance. Placement of a block so configured into a cryogenic environment would be problematic due to the differences in the thermal expansion between the bore and the liner. At these temperatures, aluminum shrinks at twice the rate of iron, meaning that the much larger block would create stresses around the liner; this in turn could lead to the liner popping out or becoming distorted. The present inventors have determined that by applying cryogenic temper stress-relief to the walls of an aluminum alloy engine block 100 without liners, there will be no thermal mismatch issues to contend with. As such, once the block 100 is relieved of the casting and machining stresses mentioned above, a thermal spray coating may be applied to the bore 160 or other substrates in need of such treatment.

Within the present context, the term "bore" and its variants is meant to encompass both the wall of the engine block defined by the cylinder bore, as well as the wall of a sleeve, liner or related insert that is placed therein to act as an intermediary between the engine wall and a reciprocating piston. As such, both variants are deemed to be within the scope of the present invention.

It is noted that terms like "preferably", "generally" and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention, it is noted that the terms "substantially" and "approximately" and their variants are utilized herein to represent the inherent degree of uncertainty that may be attributed to any quantitative comparison, value, measurement or other representation. The term "substantially" is also utilized herein to represent the degree by which a quantitative representation may vary from a stated reference without resulting in a change in the basic function of the subject matter at issue.

Having described the invention in detail and by reference to specific embodiments, it will nonetheless be apparent that modifications and variations are possible without departing from the scope of the invention defined in the appended claims. In particular it is contemplated that the scope of the present invention is not necessarily limited to stated preferred aspects and exemplified embodiments, but should be governed by the appended claims.

What is claimed is:

1. A method of treating a cylinder bore that is formed in an aluminum-based engine block, said method comprising:
activating an exposed surface of said bore with mechanical roughening; and reducing residual stress present in said activated surface through at least one of vibration stress relief, elevated temperature stress relief and cryogenic stress relief, and wherein said vibration stress relief comprises:

operating a vibrating device that is in vibration cooperation with said block in order to ascertain at least one resonant frequency response condition associated with said block;

imparting vibration to said block from said vibrating device under an operational condition that substantially coincides with said at least one resonant frequency response condition; and monitoring said imparted vibration until said residual stress is reduced to a predetermined level.

2. The method of claim 1, further comprising forming at least one protective coating on said treated bore.

3. The method of claim 2, wherein said at least one protective coating is selected from the group consisting of a thermal barrier coating, a wear resistant coating, an anti-corrosion coating, a bond-promotion coating and combinations thereof.

4. The method of claim 2, wherein said at least one protective coating is applied by thermal spraying.

5. The method of claim 2, wherein no cylinder liner is placed between said cylinder bore and said at least one protective coating.

6. The method of claim 1, wherein said monitoring further comprises measuring reductions in said residual stress.

7. The method of claim 6, wherein said measuring reductions in said residual stress comprises using X-ray diffraction.

8. The method of claim 1, wherein said operating comprises using a scan rate to sweep through a vibratory response range of said block to be slow enough to ensure full amplitude resonance for each of said at least one resonant frequency response conditions.

9. The method of claim 8, wherein said scan rate is between about 10 RPM/sec and 50 RPM/sec.

10. The method of claim 1, wherein said elevated temperature stress relief is selected from the group consisting of induction heating, plasma spray gun heating and thermal spray gun heating.

11. The method of claim 1, wherein said cryogenic stress relief is performed prior to forming at least one protective coating on said treated bore.

12. The method of claim 1, wherein said cryogenic stress relief is performed after forming at least one protective coating on said treated bore.

13. The method of claim 1, wherein said activating does not comprise either grit blasting or water jet blasting.

14. A method of forming a cylinder bore in an aluminum-based engine block, said method comprising:

casting said block to define at least one cylinder bore therein;

activating an exposed surface of said bore with mechanical roughening; and reducing residual stress present in said activated surface using vibration stress relief.

15. The method of claim 14, further comprising forming at least one protective coating on said treated bore.

* * * * *